(12) United States Patent
Ong

(10) Patent No.: US 7,306,134 B1
(45) Date of Patent: Dec. 11, 2007

(54) MULTIPOCKET FOLDER

(76) Inventor: Bon S. Ong, Box 4247, Torrance, CA (US) 90510

( * ) Notice: Subject to any disclaimer, the term of this patent is extended or adjusted under 35 U.S.C. 154(b) by 496 days.

(21) Appl. No.: 10/750,728

(22) Filed: Jan. 5, 2004

(51) Int. Cl.
*B65D 27/00* (2006.01)
*B65D 27/08* (2006.01)

(52) U.S. Cl. ...................................... 229/67.1; 229/72

(58) Field of Classification Search ...... 229/67.1–67.4, 229/72
See application file for complete search history.

(56) References Cited

U.S. PATENT DOCUMENTS

| | | | | |
|---|---|---|---|---|
| 1,463,413 A | * | 7/1923 | Wilburger | 206/311 |
| 1,683,996 A | * | 9/1928 | Snow | 150/147 |
| 2,737,991 A | * | 3/1956 | Bass | 150/132 |
| 3,186,629 A | * | 6/1965 | Tucker | 229/72 |
| 3,343,749 A | * | 9/1967 | Probst | 229/72 |
| 3,668,979 A | * | 6/1972 | Cariven | 493/384 |
| 3,858,790 A | * | 1/1975 | Humphrey | 229/72 |
| 4,639,157 A | * | 1/1987 | Herzfeld | 402/19 |
| 4,731,142 A | * | 3/1988 | Stenner | 156/226 |
| 5,598,969 A | | 2/1997 | Ong | |
| 5,876,143 A | | 3/1999 | Ong | |
| 5,913,540 A | * | 6/1999 | Ong | 281/31 |
| 6,213,516 B1 | | 4/2001 | Ong | |
| 6,382,864 B1 | * | 5/2002 | Moor | 402/79 |
| 6,666,610 B1 | * | 12/2003 | Moor et al. | 402/79 |
| 2006/0060641 A1 | * | 3/2006 | Taylor | 229/67.1 |

* cited by examiner

*Primary Examiner*—Jes F. Pascua
(74) *Attorney, Agent, or Firm*—Cislo & Thomas, LLP

(57) ABSTRACT

A multipocket document folder may be formed from a primary sheet of stiff, flexible flat stock by die cutting and folding so as to create front and back covers for the folder, each having a separate pocket on its inside surface. The primary sheet of flat stock is die cut to form a rectangular portion on which the front and back covers are delineated, and separate front and back cover pocket flaps projecting from the front and back covers, either from the sides or bottoms thereof. Pocket securing projections are also formed on the primary sheet of flat stock and extending in directions perpendicular to the front and back pocket cover flaps. In this way the front and back cover pocket flaps are foldable in a first direction relative to the spine of the folder into facing relationship to the front and back covers. The pocket securing projections are foldable in a second direction relative to the spine and perpendicular to the first direction and are permanently fastened into contact with adjacent areas of the primary sheet of flat stock to hold the front and back cover pocket flaps in facing relationship relative to the front and back covers, respectively. Pocket dividers can also be provided and are each secured along a single edge to one of the cover pocket flaps.

14 Claims, 5 Drawing Sheets

MULTIPOCKET FOLDER

BACKGROUND OF THE INVENTION

1. Field of the Invention

The present invention relates to a multipocket document folder in which the covers and pockets that are located inside of the covers are formed from a single flat sheet of stiff, flexible stock.

2. Description of the Prior Art

Various types of document folders have been devised through the years having front and back covers and inside cover pockets. However, prior devices up to this time have been unnecessarily complex in construction and have typically involved the use of several different sheets of material to form the covers and the pockets on the inside faces of the covers.

For commercially competitive reasons the production of office supply products formed from sheets of paper, card stock, and plastic materials must be performed at the lowest possible cost. Such items are fabricated from cheap materials on a massive scale. Consequently, competition within the field of sheet plastic and paper office goods is very intense. Savings in production costs of even a fraction of a cent can make the difference between a product that can be priced low enough to be commercially competitive and a product priced only slightly higher that will not sell.

One type of office folder with inside the pockets which I previously devised is described in my prior U.S. Pat. No. 5,873,513, which is hereby incorporated by reference in its entirety. While this product has been commercially successful, I have now devised a multipocket document folder that can be fabricated with even greater ease and facility.

SUMMARY OF THE INVENTION

A primary object of the present invention is to provide a multipocket document folder that can be fabricated very simply and easily and with great economy of manufacture. According to the present invention both front and back covers and inside pockets on each of the covers are formed from a single flat sheet of stiff, but flexible sheet stock. Furthermore, the pocket fastening tabs that are permanently secured to the pocket flaps are also formed from the same sheet of material as the covers and the pocket flaps.

In one broad aspect the present invention may be described as a multipocket document folder comprising a primary sheet of stiff, flexible flat stock. This sheet is formed with a rectangular base portion having opposing mutually parallel outer cover side edges, a top edge perpendicular to the side edges, and a cover spine formed in the base section, perpendicular to and intersecting the top edge. The spine extends longitudinally between the cover side edges and parallel thereto. The spine delineates front and back covers within the base portion. In addition, separate front and back cover pocket flaps are formed on the primary sheet of flat stock adjacent the base portion. These cover pocket flaps project from the front and back covers, respectively. In addition, pocket securing projections are formed on the primary sheet of flat stock and extend in directions perpendicular to the front and back pocket cover flaps. All the foregoing portions of the document folder are formed by die cutting the primary sheet of stiff, flexible flat stock in a single die cutting operation.

With this construction the front and back cover pocket flaps are foldable in a first direction relative to the spine into facing relationship relative to the front and back covers, respectively. The pocket securing projections are foldable in a second direction relative to the spine and perpendicular to the first direction. The pocket securing projections are permanently fastened into contact with adjacent areas of the primary sheet of flat stock to hold the front and back cover flaps in facing relationship relative to the front and back covers, respectively. The pocket securing projections are preferably permanently secured by heat welding.

There are two different principal embodiments of the invention. In the first embodiment each of the front and back covers has a transverse top upper edge oriented perpendicular to the spine and also a lower cover end fold parallel to the top upper edge thereof. The front and back pocket flaps extend respectively from the front and back covers and are delineated therefrom by the lower cover end folds. Each of the front and back covers has a longitudinally extending exterior flap fastening tab which serves as the pocket securing projection. These exterior flap fastening tabs are formed from the same sheet of flat stock as the front and back covers and the front and back pocket flaps. The exterior flap fastening tabs are formed at locations adjacent the front and back covers remote from the spine and proximate the lower cover end folds. The front and back pocket cover flaps are folded up into facing relationship with the front and back covers, respectively. The exterior flap fastening tabs are folded back against the facing surfaces of the cover pocket flaps and are permanently secured thereto. Preferably, the sheet of stiff, flexible flat stock is formed of a low priced plastic material, such as polypropylene or polyethylene, and the fastening tabs are permanently secured to the pocket flaps by heat welding.

In addition to the basic structure of a bifolding folder having front and back covers with inside pockets, a multipocket document folder of the invention may be equipped with pocket dividers. The pocket dividers may be formed of a separate pocket divider panel for each of the front and back covers. The divider panels may be formed from additional flat sheets of sheet stock material. The pocket divider panels both have mutually parallel inside and outside boundaries. Each of the pocket flaps has an inside boundary demarcation fold and an outside edge. Interior flap fastening tabs are formed at both of the inside boundary demarcation folds of the front and back cover pocket flaps. The interior flap fastening tabs are folded at the inside boundary demarcation folds defined on the pocket flaps over the inside edges of the pocket divider panels and are permanently secured thereto. Each of the divider panels has a free edge. The free edges of both divider panels are located proximate the cover outer side edges.

Another principal embodiment of the invention is formed from a single sheet of stiff, flexible, flat stock. It is formed with a rectangular base portion that has opposing, mutually parallel outer cover side boundaries, a top edge perpendicular to the outer cover side boundaries, and a spine formed in the base section perpendicular to and intersecting the top edge and extending longitudinally between the outer cover side boundaries and parallel thereto. The spine delineates front and back covers from each other within the base portion. The front and back covers each have a bottom boundary parallel to the top edge of the base portion. The sheet of stiff, flexible flat stock is further comprised of front and back cover pocket flaps extending in opposite directions from each other and parallel to the top edge of the base portion from the front and back cover side boundaries, respectively.

Each of the front and back cover pocket flaps has a bottom edge, a cover demarcation side boundary, an opposite side boundary, and a pocket mouth edge. The pocket securing projections are comprised of bottom flap fastening tabs cut from the same single sheet of flat stock to extend from the bottom boundaries of the front and back covers in a direction opposite the top edge. The front and back cover pocket flaps are folded at their cover demarcation side boundaries into facing relationship with the front and back covers, respectively. The bottom flap fastening tabs are folded back toward the covers and over the bottom edges of the front and back cover pocket flaps at the front and back cover bottom boundaries. The bottom flap fastening tabs are permanently secured to the front and back cover pocket flaps. With this construction the front and back cover pocket flaps form pockets on the front and back covers of the folder, respectively, open at least at the pocket mouth edges.

In this embodiment of the invention, pocket divider panels for each of the front and back covers may also be utilized, and may be fabricated from the same sheet of stiff, flexible flat stock as the front and back covers and the pocket panels. The opposite side boundaries of each of the pocket flaps is a divider delineation side boundary remote from and parallel to its cover demarcation side boundary. The divider panels are attached to the front and back cover pocket flaps at the divider delineation side boundaries thereof. The pocket divider panels are folded in between and captured by the cover panels and the pocket flaps. Each of the divider panels has a free edge. The free edges of both divider panels are located proximate the cover outer side edges.

The invention may be described with greater clarity and particularity by reference to the accompanying drawings.

DESCRIPTION OF THE EMBODIMENT

Figure 1:
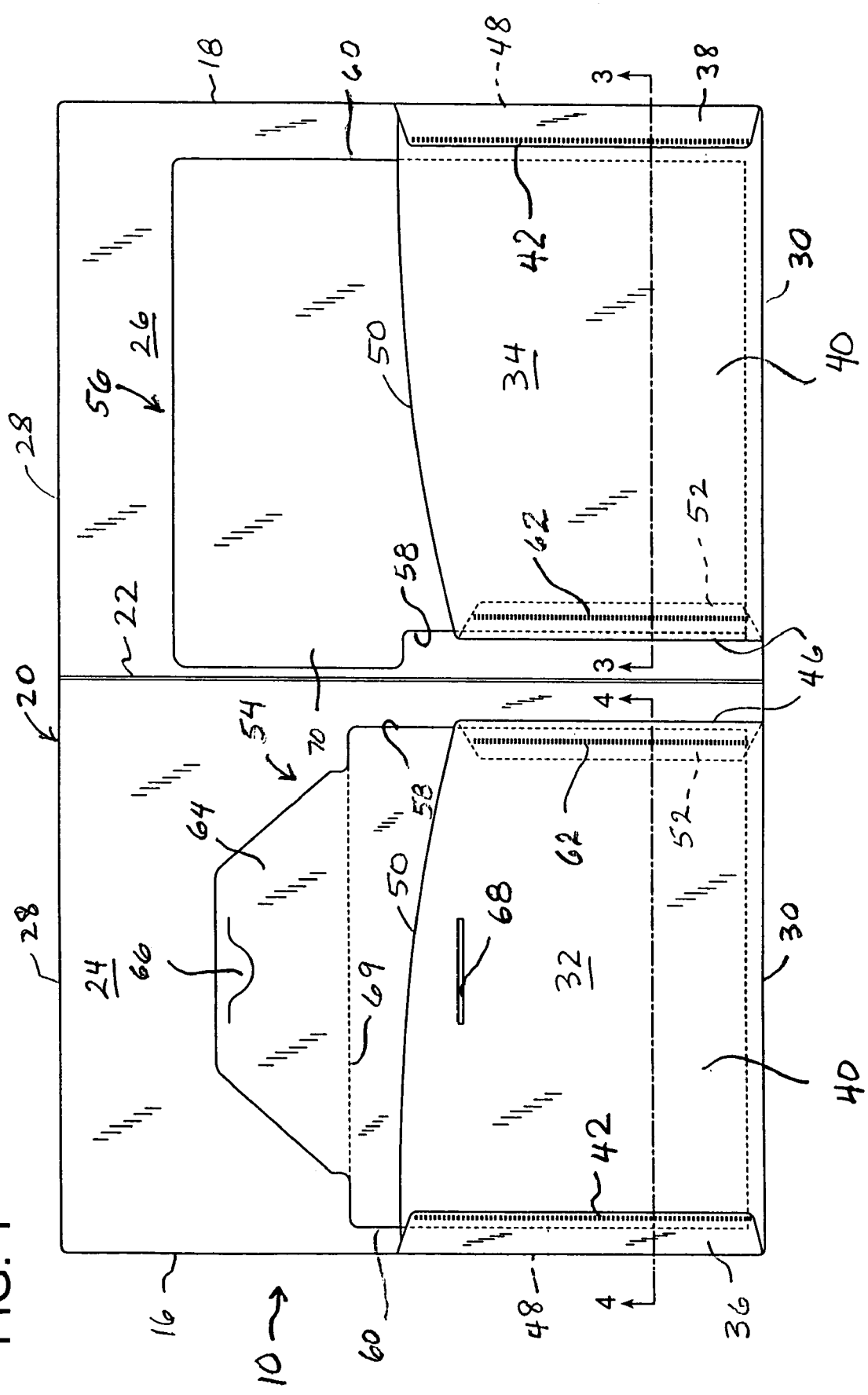
FIG. 1 is a plan view from the inside of a first embodiment of the multipocket document folder of the invention with the covers open from each other, shown in a fully fabricated condition.
Figure 2:
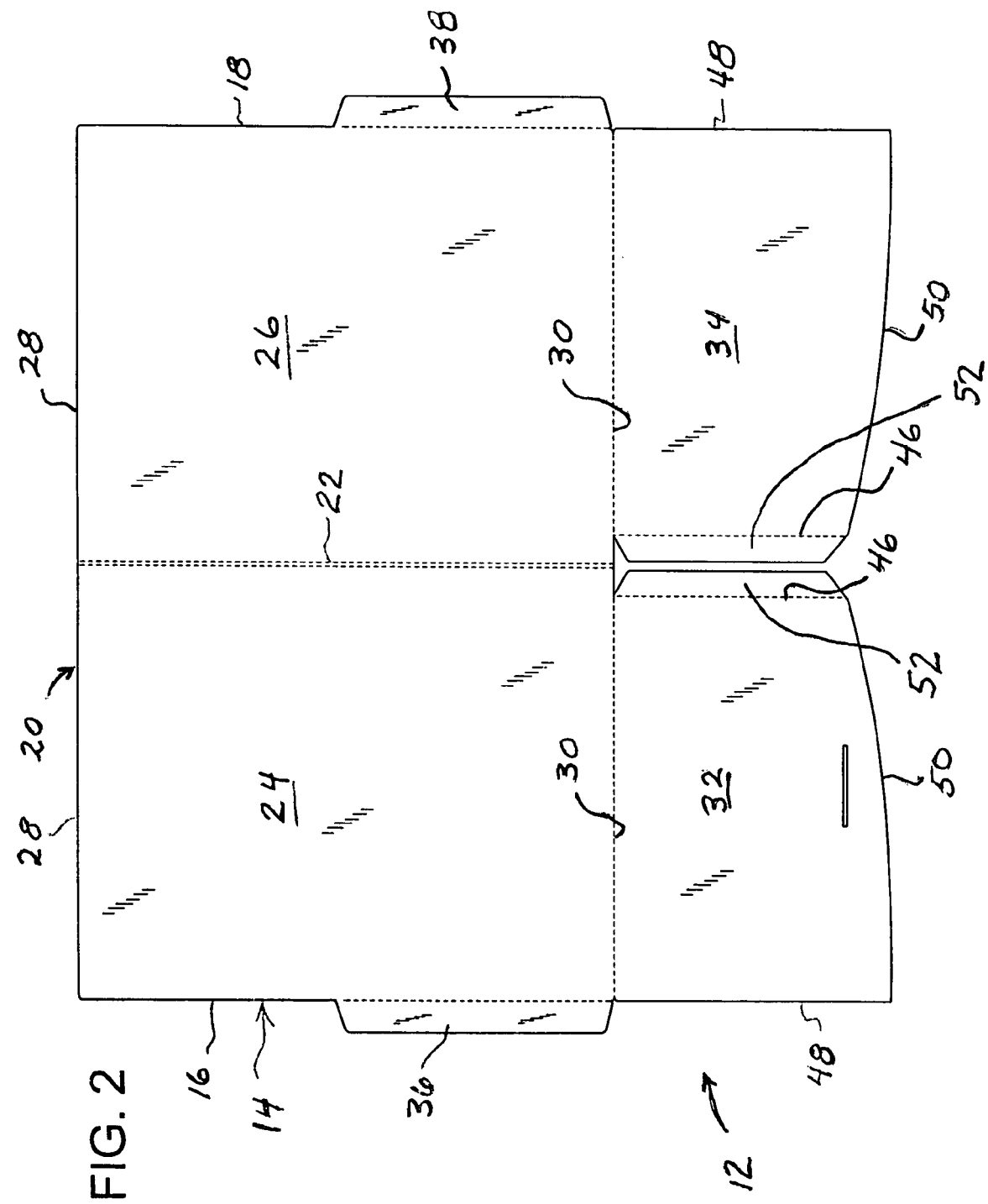
FIG. 2 is a plan view of the primary sheet of stiff, flexible flat stock utilized to form the multipocket document folder of FIG. 1 prior to folding.

FIG. 1 illustrates a multipocket document folder 10 comprising a primary sheet of stiff, flexible flat stock 12, which is illustrated prior to folding in FIG. 2. The sheet 12 is formed with a rectangular base portion of 14 having opposing, mutually parallel outer cover side edges 16 and 18, and a top edge 20 perpendicular to the side edges 16 and 18. A cover spine is formed by a bifurcating fold 22 in the base section 14. The spine fold 22 is perpendicular to and intersects the top edge 20. The spine fold 22 extends longitudinally between the cover side edges 16 and 18 and is parallel thereto. The spine fold 22 delineates a front cover 24 and a back cover 26 within the base portion 14.

Each of the front and back covers 24 and 26 has a transverse top upper edge 28 oriented perpendicular to the spine fold 22. Each of the covers 24 and 26 has a lower cover end fold 30 parallel to the top upper edge 28 thereof.

The sheet 12 of flat stock is die cut to additionally define a front cover pocket flap 32 and a back cover pocket flap 34. The front and back pocket cover flaps 32 and 34 are formed separate from each other to project from the front cover 24 and the back cover 26, respectively. The front and back pocket cover flaps 32 and 34 extend longitudinally side by side with a space therebetween, as illustrated in FIG. 2. The front and back pocket cover flaps 32 and 34 are delineated from the front and back covers 24 and 26 by the lower cover end folds 30. The front and back pocket cover flaps 32 and 34 are separated from each other by a narrow gap.

Each of the front and back covers 24 and 26 has a longitudinally extending exterior flap fastening tab. More specifically, the front cover 24 has a narrow, longitudinally extending flap fastening tab 36, while the back cover 26 has a mirror image, longitudinally extending exterior flap fastening tab 38. The exterior flap fastening tabs 36 and 38 are formed from the same sheet 12 of flat stock as the covers 24 and 26 and the pocket cover flaps 32 and 34.

The exterior flap fastening tabs 36 and 38 serve as pocket securing projections and extend in directions perpendicular to the front and back pocket cover flaps 32 and 34. That is, the width of the exterior flap fastening tabs 36 and 38 extends longitudinally, parallel to the spine fold 22, while the width of the front and back pocket cover flaps 32 and 34 extends transversely, perpendicular to the alignment of the spine fold 22.

The exterior flap fastening tabs 36 and 38 are formed from the sheet 12 of flat stock at locations adjacent the front and back covers 24 and 26, respectively, and remote from the spine fold 22. The fastening tabs 36 and 38 are formed proximate the lower cover end folds 30 of the covers 24 and 26.

To create the multipocket document folder 10 the front and back pocket cover flaps 32 and 34 are folded up at the lower cover end folds 30 into facing relationship with the front and back covers 24 and 26, respectively. The exterior flap fastening tabs 36 and 38 are folded back against the surfaces 40 of the pocket cover flaps 32 and 34 which are visible in FIG. 1, but not FIG. 2. The exterior flap fastening tabs 36 and 38 are permanently secured to the surfaces 40 of the front and back pocket flaps 32 and 34, respectively. Preferably the sheet 12 of flat stock material is a low-cost plastic such as polyethylene or polypropylene. This allows the exterior flap fastening tabs 36 and 38 to be secured to the front and back covers 24 and 26, respectively by heat welds indicated at 42 in FIG. 1.

The front and back cover pocket flaps 32 and 34 each have a longitudinally extending inside boundary demarcation fold 46 and an opposing, longitudinally extending outside edge 48. The inside boundary demarcation folds 46 and the outside edges 48 are parallel to each other and to the spine fold 22. The front and back cover pocket flaps 32 and 34 are delineated from the base portion 14 by the lower cover end folds 30. The cover pocket flaps 32 and 34 both have pocket mouth edges 50 that are spaced from the lower cover end folds 30. Interior flap fastening tabs 52 are formed from the primary sheet 12 at both of the inside boundary demarcation folds 46 of the front and back cover pocket flaps 32 and 34. The interior flap fastening tabs 52 lie longitudinally, parallel to the spine fold 22 on either side thereof and project in directions perpendicular thereto.

A stiff, flat, pocket divider panel is provided for each of the front and back covers 24 and 26. More specifically, the front cover 24 is provided with a pocket divider panel 54 while the back cover 26 is provided with a pocket divider panel 56. The pocket divider panels 54 and 56 both have mutually parallel inside and outside edges 58 and 60, respectively.

Prior to securing of the exterior flap fastening tabs 36 and 38 to the front and back cover pocket flaps 32 and 34, respectively, the interior flap fastening tabs 52 are folded over the inside edges 58 of the pocket divider panels 54 and 56 and are permanently secured thereto, preferably by longitudinally extending heat welds indicated at 62. The heat welds 62 extend throughout the width of the interior flap fastening tabs 52 and permanently secure the interior flap fastening tabs 52 to the pocket divider panels 54 and 56. The attachment of the interior flap fastening tabs 52 to the divider panels 54 and 56 adjacent their inside edges. The attachment of the pocket divider panels 54 and 56 proximate their inside edges 58 is performed prior to folding the cover pocket flaps 32 and 34 up against their respective covers 24 and 26. Thereafter, the exterior flap fastening tabs 36 and 38 are heat welded to the surfaces 40 of the cover pocket flaps 32 and 34 throughout the lengths of the outside edges 48 thereof.

As illustrated in FIG. 1, at least a first one of the pocket divider panels, specifically the pocket divider panel 54, is formed with a generally trapezoidal-shaped top pocket closure flap 64 with a pocket closure tongue 66 defined therein by die cutting. In addition, a transversely extending tongue engaging slit 68 is formed in a first one of the cover pocket flaps, specifically the front cover pocket flap 32. The slit 68 in the pocket cover flap 32 is longitudinally aligned with the pocket closure tongue 66. It is spaced from the pocket mouth edge 50 of the front cover pocket flap 32 such that when the top pocket closure flap 64 is folded down at the top closure flap folding line 69 over the mouth edge 50 of the front cover pocket flap 32, the tongue end 66 of the top closure flap 64 is releaseably engageable with the tongue engaging slit 68.

A second one of the pocket divider panels is provided with a finger tab. Specifically, the pocket divider panel 56 is provided with a longitudinally extending finger tab 70 that projects toward the spine fold 22 beyond the inside edge 58 of the second of the two pocket flaps, namely the back cover pocket flap 56.

Figure 3:
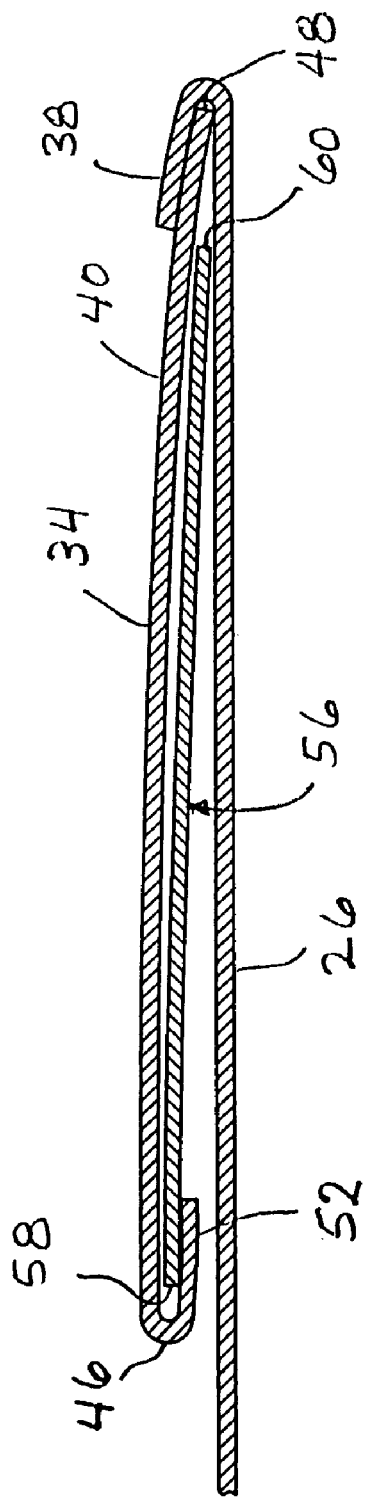
FIG. 3 is a sectional detail taken along the lines 3-3 of FIG. 1.
Figure 4:
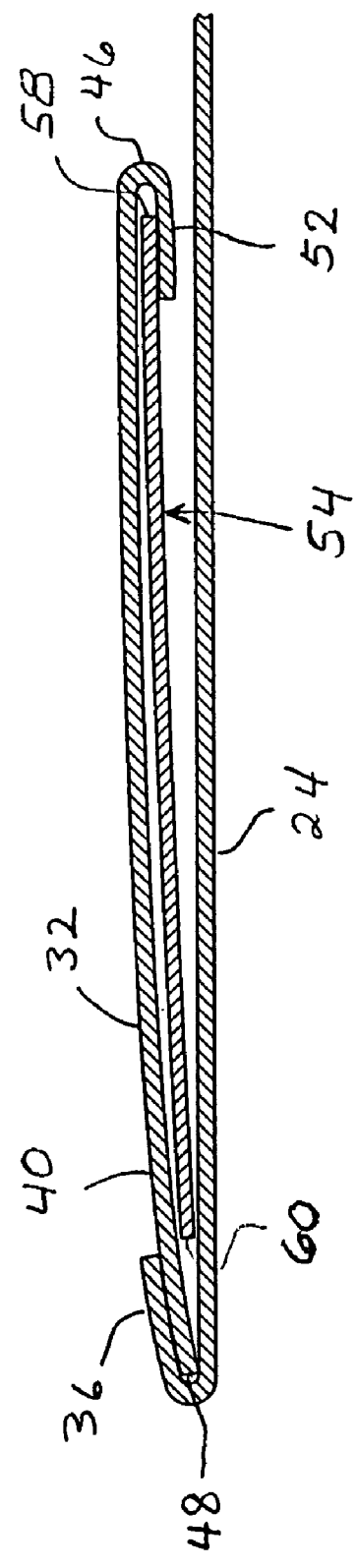
FIG. 4 is a sectional detail taken along the lines 4-4 of FIG. 1.

With construction of the pockets with divider panels as described, the outside edges 60 of the pocket divider panels 54 and 56 are both unattached to any structure, but are captured between the covers and the pocket flaps. More specifically, and as illustrated in FIG. 4, the outside edge 60 of the pocket divider panel 54 is unattached, but captured between the front cover 24 and the front cover pocket flap 32. Likewise, the outside edge 60 of the pocket divider panel 56 is unattached but captured between the back cover 26 and the back cover pocket flap 34, as illustrated in FIG. 3.

The use of the pocket divider panels 54 and 56 allows documents to be segregated within the front and back cover pockets formed in the multipocket document folder 10. Furthermore, documents in the portion of the front cover pocket between the pocket divider panel 54 and the front cover pocket flap 32 can be hidden from view and secured by engagement of the tongue 66 in the top pocket closure flap 64 with the slit 68 in the front cover pocket flap 32.

Figure 5:
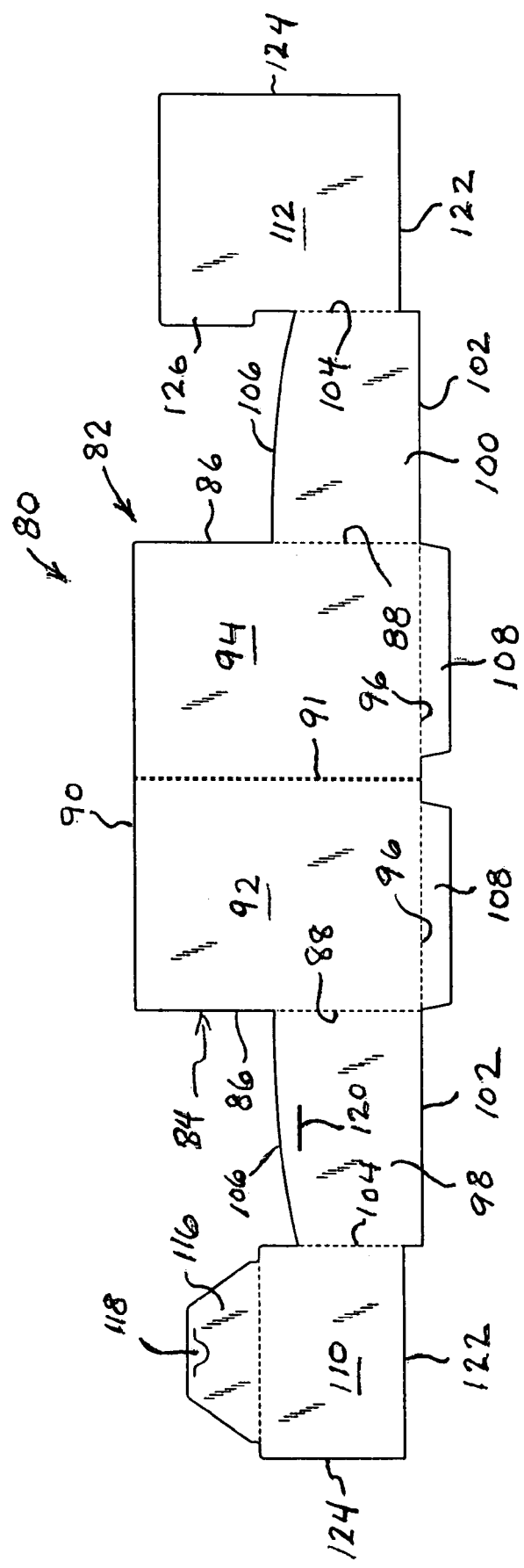
FIG. 5 is a plan view from the inside of a second embodiment of the multipocket document folder of the invention with the covers open from each other, shown in a fully fabricated condition.
Figure 6:
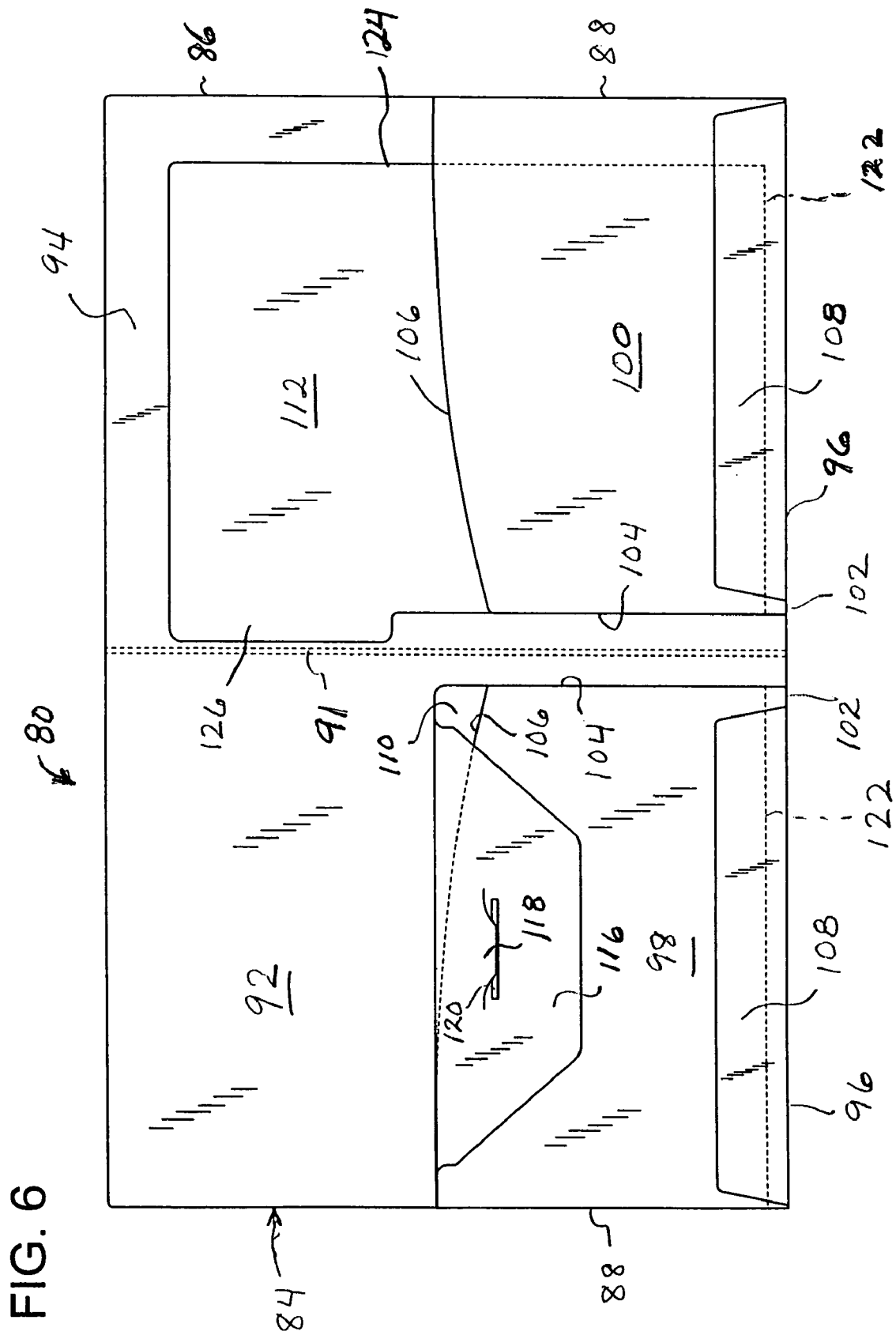
FIG. 6 is a plan view of the single sheet of stiff, flexible flat stock utilized to form the multipocket document folder of FIG. 5 prior to folding.

A second principal embodiment of the invention is illustrated in FIGS. 5 and 6. As illustrated in those drawing figures a multipocket document folder 80 is comprised of a single sheet 82 of stiff, flexible flat stock, preferably an inexpensive plastic material such as polyethylene or polypropylene. The sheet 82 is formed with a rectangular base portion 84 having opposing, mutually parallel outer cover side edges 86, mutually parallel outer side boundary folds 88, and a top edge 90 perpendicular to the outer cover side edges 86 and outer side boundary folds 88. A cover spine formed by a spine fold 91 bisects the base portion 82. The spine fold 91 is formed in the base portion 82 perpendicular to and intersecting the top edge 90. The spine fold 91 extends longitudinally between the outer cover side edges 86 and outer cover side boundaries 88 and is parallel thereto. The spine fold 91 delineates a front cover 92 and a back cover 94 within the base portion 82.

The front and back covers 92 and 94 each have a bottom boundary fold 96 parallel to the top edge 90 of the base portion 82. The multipocket document folder 80 is also formed with a front cover pocket flap 98 and a back cover pocket flap 100. The front and back cover pocket flaps 98 and 100 are formed on the sheet 82 of flat stock adjacent the base portion 84 and project laterally from the front cover 92 and the back cover 94, respectively. The front and back cover pocket flaps 98 and 100 extend parallel to the top edge 90 of the base portion 82 from the front and back cover side boundary folds 88 of the front cover 92 and the back cover 94, respectively.

Each of the front and back cover pocket flaps 98 and 100 has a straight, linear bottom edge 102 and an outer cover demarcation side boundary, which is a fold at the outer cover side boundary 88. Each of the front and back cover flaps 98 and 100 also has an opposite divider delineation side boundary 104 that is parallel to and laterally displaced from the closest outer cover demarcation side boundary 88. Each of the front and back cover flaps 98 and 100 is further defined with an upper, curved pocket mouth edge 106 that extends between the closest outer cover demarcation side boundary 88 and the closest opposite divider delineation side boundary 104.

Bottom flap fastening tabs 108 are formed as pocket securing projections and extend from the bottom boundary folds 96 of the front and back folder covers 92 and 94. The bottom flap fastening tabs 108 serve as pocket securing projections and extend from the bottom boundary folds 96 of the front and back covers 92 and 94 in a direction opposite the top edge 90 of the rectangular portion 84 of the sheet 82.

Stiff, flat, pocket divider panels 110 and 112 are formed from the sheet 82. The pocket divider panel 110 is provided for the pocket of the front cover 92, while the pocket divider panel 112 is provided for the pocket of the back cover 94. The divider panels 110 and 112 are attached to the front and back cover pocket flaps 98 and 100, respectively, at the divider delineation side boundaries 104 thereof.

At least a first one of the pocket divider panels, specifically the pocket divider panel 110, is formed with a generally trapezoidal-shaped top pocket closure flap 116 having a pocket closure tongue 118 defined therein. At least one of the cover pocket flaps, specifically the cover pocket flap 98, is formed with a tongue engaging slit 120. A second one of the pocket divider panels, specifically the pocket divider panel 112, is provided with a finger tab 126 that projects toward the spine fold 91.

The pocket divider panels 110 and 112 are slightly narrower in width then the cover pocket flaps 98 and 100 to which they are connected at their respective divider delineation side boundaries 104. Likewise, the cover pocket flaps 98 and 100 are slightly narrower in width than the covers 92 and 94 to which they are respectively connected at the cover side boundary folds 88. The straight, lower edges 122 of the pocket divider panels 110 terminate short of the bottom edges 102 of the cover pocket flaps 98 and 100. That is, the alignment of the lower edges 122 of the pocket divider panels 110 and 112 is closer to the alignment of the top edge 90 of the base portion 82 then is the alignment of the bottom edges 102 of the cover flaps 98 and 100.

To fabricate the multipocket document folder 80 the pocket divider panels 110 and 112 are folded toward the spine fold 91 and over into a facing relationship relative to the cover pocket flaps 98 and 100 to which they are joined at the divider delineation side boundary folds 104. The front cover flap 98 and the facing pocket divider panel 122 are then folded together at the cover demarcation side boundary fold 88 of the front cover 92 toward the spine fold 91 and against the inside surface of the front cover 92. Similarly, back cover flap 100 and the facing divider panel 112 are then folded together at the cover demarcation side boundary fold 88 of the back cover 94 toward the spine fold 91 and against the inside surface of the back cover 94.

The bottom flap fastening tabs 108 are then folded up into contact against the facing surfaces of the front and back cover pocket flaps 98 and 100 and are permanently attached thereto. While attachment can be performed using an adhesive, the bottom flap fastening tabs 108 are preferably heat welded to the front and back cover pocket flaps 98 and 100 closely adjacent the bottom edges 102 thereof. The bottom flap fastening tabs 108 are heat welded throughout to the front cover pocket flap 98 and to the back cover pocket flap 100 throughout the lengths of the bottom boundary folds 96 of the covers 92 and 94. Because the bottom edges 122 of the pocket divider panels 110 and 112 terminate short of the bottom edges 102 of the front and back cover pocket flaps 98 and 100, the divider panels 110 and 112 are not heat welded to either the cover pocket flaps 98 and 100 or the front and back covers 92 and 94.

It should be noted that, as with the other embodiment of the invention illustrated, the outside edges 124 of the pocket divider panels 110 and 112 are unattached but captured between the front and back covers 92 and 94 and their respective cover pocket flaps 98 and 100. The finger tab 126 projects toward the spine fold 91 beyond the divider delineation side boundary 104 of the back cover pocket flap 100.

Both of the embodiments of the multipocket document folder of the invention described may be fabricated very economically so as to produce a very low cost but highly functional document folder. Both the multipocket document folder 10 and the multipocket document folder 80 provide both front and back cover pockets, each of which has a divider that allows sorting of the documents within each pocket Undoubtedly, numerous variations and modifications of the invention will become readily apparent to those familiar with document folders. For example, the pocket securing projections may be permanently fastened using adhesive, staples, flexible fabric hook and loop fastening pads, or any other conventional fastening system. Also, the spine is not necessarily formed as a single fold but can be formed with a finite width by a pair of closely spaced, longitudinally extending, parallel folds. Furthermore, a conventional ring binding mechanism could be mounted on the inside of the spine, if desired. Accordingly, the scope of the invention should not be construed as limited to the specific embodiments depicted and described, but rather is defined in the claims appended hereto.

I claim:

1. A multipocket document folder comprising a primary sheet of stiff, flexible flat stock formed with a rectangular base portion having opposing mutually parallel outer cover side edges, a top edge perpendicular to said side edges, a cover spine formed in said base section perpendicular to and intersecting said top edge and extending longitudinally between said cover side edges and parallel thereto to delineate front and back covers within said base portion, separate front and back cover pocket flaps formed on said primary sheet of flat stock adjacent said base portion and projecting from said front and back covers, respectively, pocket securing projections formed on said primary sheet of flat stock and extending in directions perpendicular to said front and back cover pocket flaps, whereby said front and back cover pocket flaps are foldable in a first direction relative to said spine into facing relationship relative to said front and back covers, respectively, said pocket securing projections are foldable in a second direction relative to said spine and perpendicular to said first direction and are permanently fastened into contact with adjacent areas of said primary sheet of flat stock to hold said front and back cover pocket flaps in facing relationship relative to said front and back covers, respectively, said front and back covers each have a lower cover end fold parallel to said top edge, and said front and back cover pocket flaps are delineated from said base portion by said lower cover end folds, and said front and back cover pocket flaps both have straight, linear opposing inside and outside boundaries that are parallel to said spine fold and mouth edges spaced from said lower cover end folds, and said pocket securing projections are exterior flaps fastening tabs formed on said outer cover side edges of said base portion, said exterior flap fastening tabs are folded back over said outside boundaries of said front and back cover pocket flaps and said exterior flaps fastening tabs are permanently fastened to said front and back cover pocket flaps, interior flap fastening tabs formed from said primary sheet at both of said inside boundaries of said front and back cover pocket flaps, and further comprising a stiff, flat, pocket divider panel for each of said front and back covers, and said pocket divider panels both have mutually parallel inside and outside edges, and said interior flap fastening tabs are folded over said inside edges of said pocket divider panels and are permanently secured thereto.

2. A multipocket document folder according to claim 1 wherein said interior flap fastening tabs are heat welded throughout their widths to said pocket divider panels.

3. A multipocket document folder according to claim 1 wherein at least a first one of said pocket divider panels is formed with a top pocket closure flap with a pocket closure tongue defined therein, and said top closure flap of said first one of said pocket divider panels folds down over said mouth edge of a first one of said cover pocket flaps, and said first one of said cover pocket flaps is formed with a tongue engaging slit, and said tongue of said top closure flap of said first one of said divider panels is releaseably engageable with said tongue engaging slit.

4. A multipocket document folder according to claim 3 wherein a second one of said pocket divider panels is provided with a finger tab that projects toward said spine beyond said inside boundary of a second one of said front and back cover pocket flaps.

5. A multipocket document folder according to claim 1 wherein said outside edges of said pocket divider panels are unattached but captured between said covers and said pocket flaps.

6. A multipocket document folder comprising a primary sheet of stiff, flexible flat stock formed with a rectangular base portion having opposing mutually parallel outer cover side edges, a top edge perpendicular to said side edges, a cover spine formed in said base section perpendicular to and intersecting said top edge and extending longitudinally between said cover side edges and parallel thereto to delineate front and back covers within said base portion, separate front and back cover pocket flaps formed on said primary sheet of flat stock adjacent said base portion and projecting from said front and back covers, respectively, pocket securing projections formed on said primary sheet of flat stock and extending in directions perpendicular to said front and back cover pocket flaps, whereby said front and back cover pocket flaps are foldable in a first direction relative to said spine into facing relationship relative to said front and back covers, respectively, said pocket securing projections are foldable in a second direction relative to said spine and perpendicular to said first direction and are permanently fastened into contact with adjacent areas of said primary sheet of flat stock to hold said front and back cover pocket flaps in facing relationship relative to said front and back covers, respectively, wherein said front and back covers each have a lower end delineated by a bottom boundary fold parallel to said top edge of said base portion and said front and back cover pocket flaps project from said base portion at said outer cover side edges thereof, and each of said cover pocket flaps has a bottom edge, and an opposing upper mouth edge, and a cover delineation edge extending therebetween and parallel to said spine, and said pocket securing projections are bottom cover tabs delineated from said lower end of said front and back covers at said bottom boundary folds and folded up over said bottom edges of said front and back cover pocket flaps and permanently fastened thereto adjacent said bottom edges thereof, wherein said bottom cover tabs are heat welded to said front and back cover pocket flaps adjacent said bottom edges thereof.

7. A multipocket document folder according to claim 6 wherein said front and back cover pocket flaps each have a divider delineation side edge remote from and parallel to said cover delineation edge thereof, and further comprising a stiff, flat, pocket divider panel for each of said front and back covers, and said divider panels are attached to said front and back cover pocket flaps at said divider delineation side edges thereof, and said pocket divider panels are folded in between and captured by said front and back cover panels and said pocket flaps.

8. A multipocket document folder according to claim 7 wherein said divider panels each have a free edge and said free edges of said divider panels are located proximate to said outer cover side edges.

9. A multipocket document folder according to claim 8 wherein at least a first one of said pocket divider panels is formed with a top pocket closure flap having a pocket closure tongue defined therein, and said top pocket closure flap folds down over said mouth edge of a first one of said cover pocket flaps, and said first one of said pocket cover flaps is formed with a tongue engaging slit, and said tongue of said top closure flap of said first one of said divider panels is releaseably engageable with said tongue engaging slit.

10. A multipocket document folder according to claim 9 wherein a second one of said pocket divider panels is provided with a finger tab that projects toward said spine fold beyond said divider delineation side edge of a second one of said front and back cover pocket flaps.

11. A multipocket document folder comprising a primary sheet of stiff, flexible flat stock having a rectangular base portion longitudinally bifurcated by a spine to delineate front and back covers from each other, each cover having a transverse top upper edge oriented perpendicular to said spine and each cover having a lower cover end fold parallel to said top upper edge thereof, and further comprising separate longitudinally projecting front and back pocket flaps extending respectively from said front and back covers and delineated therefrom by said lower cover end folds, and each of said front and back covers has a longitudinally extending exterior flap fastening tab and said exterior flap fastening tabs are formed from said sheet of flat stock at locations adjacent said front and back covers remote from said spine, and said front and back pocket cover flaps are folded up into facing relationship with said front and back covers, respectively, and said exterior flap fastening tabs are folded back against said cover pocket flaps and are permanently secured thereto remote from said spine, further characterized in that each of said pocket flaps has an inside demarcation fold and an outside edge, and further comprising interior flap fastening tabs formed on both of said inside demarcation folds of said front and back cover pocket flaps, and a stiff, flat, pocket divider panel for each of said front and back covers, and said pocket divider panels both have mutually parallel inside and outside edges, and said interior flap fastening tabs are folded at said inside demarcation folds over said inside edges of said pocket divider panels and are permanently secured thereto.

12. A multipocket document folder according to claim 11 wherein said exterior flap fastening tabs are heat welded throughout their widths to said front and back cover pocket flaps, and wherein said interior flap fastening tabs are heat welded throughout their widths to said pocket divider panels, and said outside edges of said pocket divider panels are unattached but captured between said covers and said pocket flaps.

13. A multipocket document folder comprising a single sheet of stiff, flexible flat stock formed with a rectangular base portion having opposing, mutually parallel outer cover side boundaries, a top edge perpendicular to said outer cover side boundaries, a spine formed in said base section perpendicular to and intersecting said top edge and extending longitudinally between said outer cover side boundaries and parallel thereto to delineate front and back covers from each other within said base portion, wherein said front and back covers each have a bottom boundary parallel to said top edge of said base portion, and further comprising front and back cover pocket flaps extending from said outer cover side boundaries parallel to said top edge of said base portion, from said front and back cover side boundaries, respectively, and each of said front and back cover pocket flaps has a bottom edge, a cover demarcation side boundary, an opposite side boundary, and a pocket mouth edge, and further comprising bottom flap fastening tabs cut from said sheet of flat stock to extend from said bottom boundaries of said front and back covers in a direction opposite said top edge, and said front and back cover pocket flaps are folded at said cover demarcation side boundaries into facing relationship with said front and back covers, respectively, and said bottom flap fastening tabs are folded from said bottom boundaries back toward said covers and over said bottom edges of said front and back cover pocket flaps at said front and back cover bottom boundaries and are permanently secured to said front and back cover pocket flaps, whereby said front and back cover pocket flaps form pockets on said front and back covers, respectively, open at least at said pocket mouth edges, wherein said front and back cover pocket flaps each have a divider delineation side boundary remote from and parallel to said cover demarcation side boundary thereof, and further comprising a stiff, flat, pocket divider panel for each of said front and back covers, and said divider panels are attached to said front and back cover pocket flaps at said divider delineation side boundaries thereof, and said pocket divider panels are folded in between and captured by said front and back covers and said pocket flaps.

14. A multipocket document folder comprising a single sheet of stiff, flexible flat stock formed with a rectangular base portion having opposing, mutually parallel outer cover side boundaries, a top edge perpendicular to said outer cover side boundaries, a spine formed in said base section perpendicular to and intersecting said top edge and extending longitudinally between said outer cover side boundaries and parallel thereto to delineate front and back covers from each other within said base portion, wherein said front and back covers each have a bottom boundary parallel to said top edge of said base portion, and further comprising front and back cover pocket flaps extending from said outer cover side boundaries parallel to said top edge of said base portion, from said front and back cover side boundaries, respectively, and each of said front and back cover pocket flaps has a bottom edge, a cover demarcation side boundary, an opposite side boundary, and a pocket mouth edge, and further comprising bottom flap fastening tabs cut from said sheet of flat stock to extend from said bottom boundaries of said front and back covers in a direction opposite said top edge, and said front and back cover pocket flaps are folded at said cover demarcation side boundaries into facing relationship with said front and back covers, respectively, and said bottom flap fastening tabs are folded from said bottom boundaries back toward said covers and over said bottom edges of said front and back cover pocket flaps at said front and back cover bottom boundaries and are permanently secured to said front and back cover pocket flaps, whereby said front and back cover pocket flaps form pockets on said front and back covers, respectively, open at least at said pocket mouth edges, wherein each of said divider panels has a free edge and said free edges of said divider panels are located proximate to said outer cover demarcation side boundaries, and wherein at least one of said pocket divider panels is formed with a top pocket closure flap having a pocket closure tongue defined therein, and folds down over said mouth edge of a first one of said cover pocket flaps, and said at least one of said pocket cover flaps is formed with a tongue engaging slit, and said tongue of said top closure flap of said first one of said divider panels is releaseably engageable with said tongue engaging slit, and a second of said pocket divider panels is provided with a finger tab that projects toward said spine beyond said opposite side boundary of a second one of said front and back cover pocket flaps, and said bottom flap fastening tabs are heat welded to said front and back cover pocket flaps throughout the lengths of said bottom edges thereof, and said bottom flap fastening tabs are heat welded throughout their widths to said front and back cover pocket flaps.

* * * * *